(12) United States Patent
Yu et al.

(10) Patent No.: US 11,510,224 B2
(45) Date of Patent: Nov. 22, 2022

(54) COORDINATED DYNAMIC AND SEMI-PERSISTENT SCHEDULING ALLOCATION FOR NETWORK SLICE

(71) Applicant: NOKIA TECHNOLOGIES OY, Espoo (FI)

(72) Inventors: Ling Yu, Kauniainen (FI); Vinh Van Phan, Oulu (FI); Mark Doll, Stuttgart (DE); Peter Rost, Heidelberg (DE); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/612,634

(22) PCT Filed: Apr. 26, 2018

(86) PCT No.: PCT/EP2018/060728
§ 371 (c)(1),
(2) Date: Nov. 11, 2019

(87) PCT Pub. No.: WO2018/206301
PCT Pub. Date: Nov. 15, 2018

(65) Prior Publication Data
US 2020/0205176 A1   Jun. 25, 2020

(30) Foreign Application Priority Data
May 11, 2017   (GR) .............................. 20170100236

(51) Int. Cl.
*H04W 72/04*   (2009.01)
*H04W 72/12*   (2009.01)
*H04L 1/00*    (2006.01)
*H04W 48/18*   (2009.01)

(52) U.S. Cl.
CPC ....... *H04W 72/1257* (2013.01); *H04L 1/0004* (2013.01); *H04W 48/18* (2013.01); *H04W 72/1263* (2013.01)

(58) Field of Classification Search
None
See application file for complete search history.

(56) References Cited

U.S. PATENT DOCUMENTS

| 7,912,007 | B2 * | 3/2011 | Fan | H04W 72/12 370/329 |
| 2020/0305167 | A1 * | 9/2020 | Freda | H04W 72/0493 |

FOREIGN PATENT DOCUMENTS

EP   2 234 303 A1   9/2010

OTHER PUBLICATIONS

International Search Report & Written Opinion dated Sep. 3, 2018 corresponding to International Patent Application No. PCT/EP2018/060728.

Qualcomm Incorporated, "DL indication channel design principle for URLLC/eMBB dyanmic multiplexing," 3GPP Draft; R1-1708637, 3GPP TSG-RAN WG1 #89, Hangzhou P.R. China, May 15-19, 2017, May 7, 2017, XP051263266.

(Continued)

*Primary Examiner* — Willie J Daniel, Jr.
(74) *Attorney, Agent, or Firm* — Squire Patton Boggs (US) LLP

(57) ABSTRACT

Certain embodiments may relate to communication systems, and, for example, some embodiments may relate to allocating resources of one or more network slices in a communication system.

43 Claims, 8 Drawing Sheets

(56) References Cited

OTHER PUBLICATIONS

InterDigital Communications, "Scheduling for Ultra-Low Latency Transmissions in NR," 3GPP Draft, R2-1703539 (R15 NR WI A110315 Scheduling), 3GPP TSG-RAN WG2 #97bis, Spokane, Washington, Apr. 3-7, 2017, Apr. 3, 2017, XP051245384.
Communication pursuant to Article 94(3) EPC dated Sep. 17, 2021 corresponding to European Patent Application No. 18722435.7.

\* cited by examiner

COORDINATED DYNAMIC AND SEMI-PERSISTENT SCHEDULING ALLOCATION FOR NETWORK SLICE

BACKGROUND

Field

Certain embodiments may relate to communication systems, and, for example, some embodiments may relate to allocating resources of one or more network slices in a communication system.

Description of the Related Art

In a communication system, such as a Long-Term Evolution (LTE) network, 5th generation (5G) mobile network, or next-generation network system, user equipment (UE) may connect to one or more network slices. A network slice includes a complete logical network, providing telecommunications services and network capabilities, and may be fully or partially, and logically and/or physically, isolated from another slice instance. A UE may access multiple network slices simultaneously via a single radio access network (RAN), and may provide network slice selection assistance information (NSSAI) to assist in selecting network slice instances (NSI) for the UE to use. A UE may access multiple slices simultaneously via single RAN, where the multiple slices share common control network functions (CCNF), including an access and mobility management function (AMF) and/or network slice instance selection function (NSISF).

SUMMARY

In accordance with an embodiment, there is a method that comprises transmitting, by a network entity, a semi-persistent scheduling configuration to a user equipment. The method further comprises receiving, by the network entity, a resource allocation request from the user equipment. The method further comprises transmitting, by the network entity, a semi-persistent scheduling allocation to the user equipment. The method further comprises transmitting, by the network entity, a dynamic resource allocation with an override indicator to the user equipment. The override indicator indicates whether the user equipment should override the semi-persistent scheduling allocation with the dynamic resource allocation.

In accordance with an embodiment, there is a method that comprises receiving, by a user equipment, a semi-persistent scheduling configuration from a network entity. The method further comprises transmitting, by the user equipment, a resource allocation request to the network entity. The method further comprises receiving, by the user equipment, a semi-persistent scheduling allocation. The method further comprises receiving, by the user equipment, a dynamic resource allocation with an override indicator. The override indicator indicates whether the user equipment should override the existing semi-persistent scheduling allocation.

In accordance with an embodiment, there is an apparatus comprising at least one processor and at least one memory including computer program code. The at least one memory and the computer program code are configured to, with the at least one processor, cause the apparatus to at least transmit a semi-persistent scheduling configuration to a user equipment. The at least one memory and the computer program code are further configured to, with the at least one processor, cause the apparatus to at least receive a resource allocation request from the user equipment. The at least one memory and the computer program code are further configured to, with the at least one processor, cause the apparatus to at least transmit a semi-persistent scheduling allocation to the user equipment. The at least one memory and the computer program code are further configured to, with the at least one processor, cause the apparatus to at least transmit a dynamic resource allocation with an override indicator to the user equipment. The override indicator indicates whether the user equipment should override the semi-persistent scheduling allocation with the dynamic resource allocation.

In accordance with an embodiment, there is an apparatus comprising at least one processor and at least one memory including computer program code. The at least one memory and the computer program code are configured to, with the at least one processor, cause the apparatus to at least receive a semi-persistent scheduling configuration from a network entity. The at least one memory and the computer program code are further configured to, with the at least one processor, cause the apparatus to at least transmit a resource allocation request to the network entity. The at least one memory and the computer program code are further configured to, with the at least one processor, cause the apparatus to at least receive a semi-persistent scheduling allocation. The at least one memory and the computer program code are further configured to, with the at least one processor, cause the apparatus to at least receive a dynamic resource allocation with an override indicator. The override indicator indicates whether the user equipment should override the existing semi-persistent scheduling allocation.

In accordance with an embodiment, an apparatus can include means for transmitting a semi-persistent scheduling configuration to a user equipment. The apparatus can further include means for receiving a resource allocation request from the user equipment. The apparatus can further include means for transmitting a semi-persistent scheduling allocation to the user equipment. The apparatus can further include means for transmitting a dynamic resource allocation with an override indicator to the user equipment. The override indicator indicates whether the user equipment should override the semi-persistent scheduling allocation with the dynamic resource allocation.

In accordance with an embodiment, an apparatus can include means for receiving a semi-persistent scheduling configuration from a network entity. The apparatus can further include means for transmitting a resource allocation request to the network entity. The apparatus can further include means for receiving a semi-persistent scheduling allocation. The apparatus can further include means for receiving a dynamic resource allocation with an override indicator. The override indicator indicates whether the user equipment should override the existing semi-persistent scheduling allocation.

A non-transitory computer readable medium can, in certain embodiments, be encoded with instructions that, when executed in hardware, perform a process. The process can include a method that comprises transmitting, by a network entity, a semi-persistent scheduling configuration to a user equipment. The method further comprises receiving, by the network entity, a resource allocation request from the user equipment. The method further comprises transmitting, by the network entity, a semi-persistent scheduling allocation to the user equipment. The method further comprises transmitting, by the network entity, a dynamic resource allocation with an override indicator to the user equipment. The override indicator indicates whether the user equipment should override the semi-persistent scheduling allocation with the dynamic resource allocation.

A non-transitory computer readable medium can, in certain embodiments, be encoded with instructions that, when executed in hardware, perform a process. The process can include a method that comprises receiving, by a user equipment, a semi-persistent scheduling configuration from a network entity. The method further comprises transmitting, by the user equipment, a resource allocation request to the network entity. The method further comprises receiving, by the user equipment, a semi-persistent scheduling allocation. The method further comprises receiving, by the user equipment, a dynamic resource allocation with an override indicator. The override indicator indicates whether the user equipment should override the existing semi-persistent scheduling allocation.

A computer program product can, according to certain embodiments, encode instructions for performing a process. The process can include a method that comprises transmitting, by a network entity, a semi-persistent scheduling configuration to a user equipment. The method further comprises receiving, by the network entity, a resource allocation request from the user equipment. The method further comprises transmitting, by the network entity, a semi-persistent scheduling allocation to the user equipment. The method further comprises transmitting, by the network entity, a dynamic resource allocation with an override indicator to the user equipment. The override indicator indicates whether the user equipment should override the semi-persistent scheduling allocation with the dynamic resource allocation.

A computer program product can, according to certain embodiments, encode instructions for performing a process. The process can include a method that comprises receiving, by a user equipment, a semi-persistent scheduling configuration from a network entity. The method further comprises transmitting, by the user equipment, a resource allocation request to the network entity. The method further comprises receiving, by the user equipment, a semi-persistent scheduling allocation. The method further comprises receiving, by the user equipment, a dynamic resource allocation with an override indicator. The override indicator indicates whether the user equipment should override the existing semi-persistent scheduling allocation.

BRIEF DESCRIPTION OF THE DRAWINGS

For proper understanding of this disclosure, reference should be made to the accompanying drawings, wherein.

DETAILED DESCRIPTION

Figure 1:
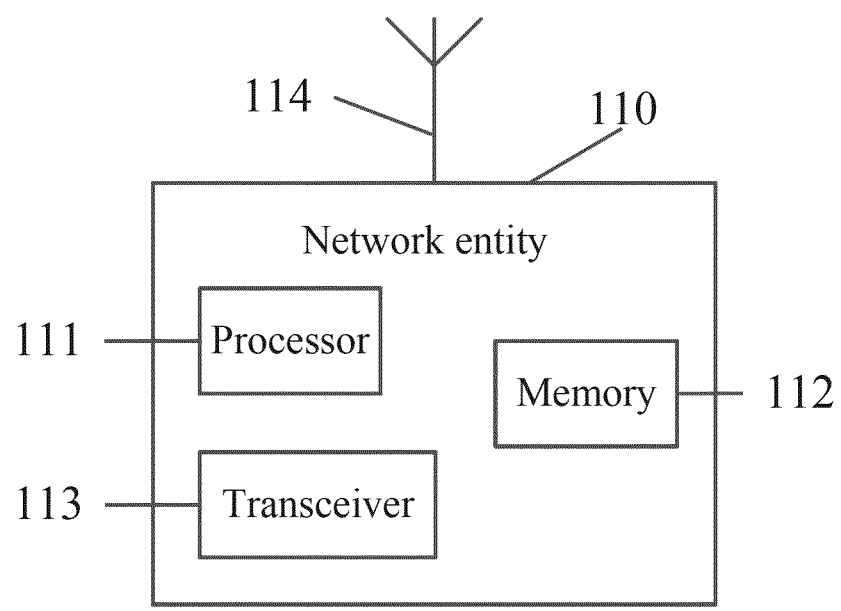
FIG. 1 illustrates a system according to certain embodiments.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

A common RAN may be deployed to support multiple network slices, where each network slice may be required to have complete or at least partial separation from other network slices in order to satisfy the network service requirements of the network slice. The separation of network resources including radio resources may be needed to support network slicing even when a common RAN is deployed for multiple network slices. The semi-persistent scheduling (SPS) based resource allocation is one effective and flexible way to separate and guarantee that certain resources are allocated and/or reserved for a given network slice, and may be used for other network slices for more efficient and flexible usage of the resource since the resource may not be fully utilized by a given network slice all the time. Alternatively, a dynamic scheduled resource may be allocated for the same and/or different network slice in order to satisfy additional requests of the resource on top of SPS. User equipment that needs simultaneous access to multiple network slices which provide different types of services may use SPS resource allocation for one network slice, while also using dynamic resource allocation for another network slice. Thus, challenges may arise when coordinating a SPS resource allocation and dynamic resource allocation for a UE simultaneously accessing multiple network slices.

Certain embodiments contained herein may have various benefits and/or advantages. For example, certain embodiments may facilitate resource reservation and separation among multiple network slices by ensuring various network slices provide certain guaranteed resources offered, while also allowing flexible resource usage on-demand among multiple network slices. Certain embodiments are directed to improvements in computer-related technology by reducing signaling and processing overhead, thus increasing the dynamicity and efficiency of resource usage.

In some embodiments, the UE may be configured with a SPS configuration when it accesses a network slice. In some embodiments, the SPS configuration may be UE-specific SPS configuration for the network slice using dedicated signaling. In some embodiments, the SPS configuration may be a network slice-specific SPS configuration, which may be configured via common control signaling and may be applied for all relevant UEs accessing the network slice. The network-slice specific SPS configuration may convey semi-static, common, and/or default elements of the SPS resource allocation applied for UE-specific SPS configuration for some or all relevant UEs in the corresponding network slice. In some embodiments, the UE may be configured with a combination of UE-specific SPS configuration for the network slice using dedicated signaling and network slice-specific SPS configuration using common control signaling.

In some embodiments, the SPS configuration may include a range of physical resource blocks (PRBs), a number of gross bits per transmission time interval (TTI), and/or a RAN-level identifier for the network slice, such as a RAN-NSI-ID. In some embodiments, a range of PRBs and/or a number of gross bits per III may be restricted to only network slice-specific SPS configuration.

In some embodiments, the SPS configuration may include a priority level of using the SPS allocation between network slice-specific control/data traffic and common control signaling, such as physical layer control signaling of a channel quality indication (CQI) and scheduling request (SR), medium access control (MAC) elements, and/or radio resource control (RRC) signaling. For example, where a single RRC connection may be used for more than one or all network slices which are serving the UE, signaling radio bearers (SRBs) which carry RRC control signaling for more than one or all network slices may be configured with a higher priority for using the UE-specific or network slice-specific SPS configuration than network slice-specific/associated data traffic.

In some embodiments, UE-specific SPS configuration and/or network slice-specific SPS configuration may be triggered depending upon one or more factors, such as the network slice requested by the UE, a network slice-related UE profile/policy, and/or a requested service that is provided by a network slice. In some embodiments, a network slice requested by the UE may determine which SPS configuration is triggered based on factors such as whether one or more guaranteed resources need to be allocated to the network slice and/or a quality of service (QoS) provided by the network slice. In some embodiments, a network slice-related UE profile/policy may determine which SPS configuration may be triggered based upon factors such as a rank and/or a priority that the UE has access to a given network slice for certain services.

In some embodiments, a UE-specific SPS configuration may be used where the UE desires a high priority of a service provided on the network slice and/or desires a periodic resource allocation based on the QoS for the UE traffic.

In some embodiments, a network slice-specific SPS configuration with a defined range of PRBs may be used where a network slice is required to reserve a certain amount of network resources, allowing the UE that accesses the network slice having the higher priority of using the defined PRBs to transmit network traffic related to the network slice.

In some embodiments, a network slice-specific or UE-specific SPS configuration with a number of gross bits per TTI may be used where the network slice is required to offer a certain guaranteed bit rate for each UE, allowing UEs that access the network slice to have a higher priority of using allocated SPS resources in order to satisfy the guaranteed bit rate requirement.

In some embodiments, a UE may access one or more network slices simultaneously, and may be configured with network slice-specific SPS configuration and/or UE-specific SPS configuration for a particular network slice. The UE may be configured with data radio bearers (DRBs) to carry the data flows of the network slices, as well as differentiate resources allocated under SPS configuration from resources allocated under dynamic resource allocation for various network slices.

In some embodiments, a physical scheduling control channel, such as a physical downlink control channel (PDCCH), may activate an SPS allocation related to a given network slice for a UE. The data of one or more DRBs that are configured for the network slice may have a higher priority to use the SPS allocation, for example, if SPS configuration does not provide an indication of a higher priority for using SPS allocation by common control signaling. If DRBs specific to the given network slice cannot fully fill the one or more allocated SPS resources, one or more other DRBs that are configured to support multiplexing of multiple network slices or specific to other network slices may use the allocated SPS resources.

FIG. 1 illustrates a system according to certain embodiments. In one embodiment, a system may include multiple devices, such as, for example, network entity 110. Network entity 110 may include one or more user equipment and/or a next generation node B (gNB). A network entity may also include a next generation radio access network, mobility management entity, serving gateway, base station, such as an evolved node B, a server, and/or other access node.

One or more of these devices may include at least one processor, respectively indicated as 111. At least one memory may be provided in one or more of devices indicated at 112. The memory may be fixed or removable. The memory may include computer program instructions or computer code contained therein. Processor 111 and memory 112, or a subset thereof, may be configured to provide means corresponding to the various blocks of FIG. 2. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceiver 113 may be provided, and one or more devices may also include at least one antenna, respectively illustrated as 114. The device may have many antennas, such as an array of antennas configured for multiple input multiple output (MIMO) communications, or multiple antennas for multiple radio access technologies. Other configurations of these devices, for example, may be provided.

Transceiver 113 may be a transmitter, a receiver, or both a transmitter and a receiver, or a unit or device that may be configured both for transmission and reception.

Processor 111 may be embodied by any computational or data processing device, such as a central processing unit (CPU), application specific integrated circuit (ASIC), or comparable device. The processors may be implemented as a single controller, or a plurality of controllers or processors.

Memory 112 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment to perform any of the processes described below (see, for example, FIGS. 3-8). Therefore, in certain embodiments, a non-transitory computer-readable medium may be encoded with computer instructions that, when executed in hardware, perform a process such as one of the processes described herein. Alternatively, certain embodiments may be performed entirely in hardware.

Figure 2:
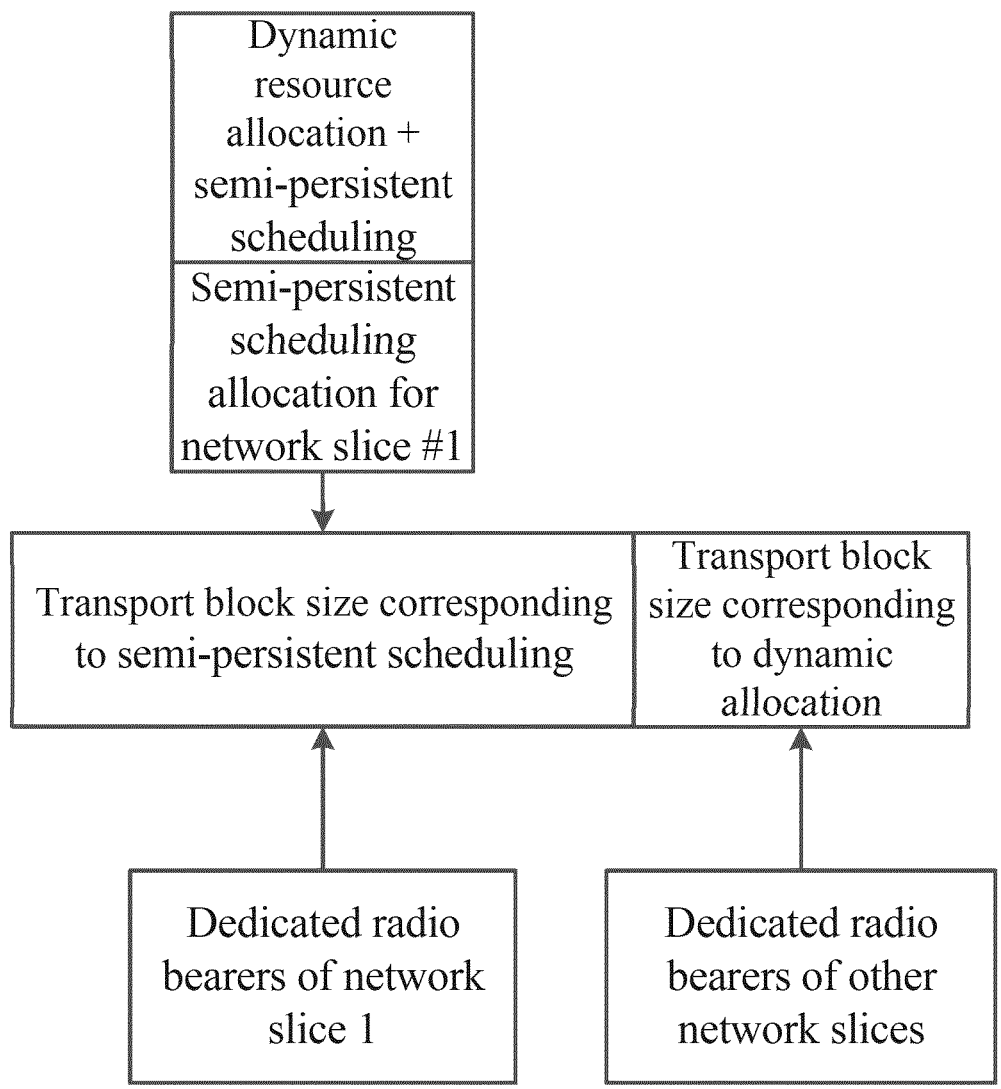
FIG. 2 illustrates an example of a data structure according to certain embodiments.

FIG. 2 illustrates an example data structure. For example, in some embodiments, a SPS resource for a given network slice may be allocated at the same subframe/TTI as a dynamic resource allocation for other network slices as well. Rather than overriding the existing SPS allocation at the same subframe/TTI, dynamic resource allocation may coordinate the allocation of the slice-related SPS resource by using an override indicator in the dynamic scheduling information.

In some embodiments, an override indicator may comprise a field with a number of bits, such as a 1-bit or 2-bit field, and may indicate whether dynamic allocation should override the existing SPS allocation at the same subframe/TTI. In some embodiments, a 2-bit override indicator of "00" may indicate that dynamic scheduling should override SPS allocation. In some embodiments, a 2-bit indicator of "10" may indicate that dynamic scheduling should not override the existing SPS allocation, but the modulation and coding scheme (MCS) defined in dynamic scheduling should override the MCS defined in the SPS-allocated TTIs. In some embodiments, a 2-bit indicator of "11" may indicate that dynamic scheduling should not override the SPS allocation nor MCS. In some embodiments, a 2-bit indicator of "01" may indicate that dynamic scheduling does not include MCS, leaving the MCS provided by the SPS allocation for the dynamic scheduled resource.

In some embodiments, if the received dynamic scheduling indicates that the SPS allocation should not be overridden, and only one transport block can be transmitted per TTI for the UE, a transport block size (TBS) may be calculated based upon the PRBs allocated during dynamic scheduling, as well as the SPS allocation and MCS. When a transport block is formed, the amount of data corresponding to the SPS allocation may be filled from network slice DRBs related to the existing SPS allocation, and the remaining data may be filled with DRBs for the same or other network slices, depending on, for example, the priority of DRBs associated to resources allocated with the dynamic scheduling. However, if the prioritized data regarding the SPS allocation cannot fully fill the portion of the transport block corresponding to the SPS allocation, one or more unused portions of the transport block may be filled by the data of the DRB or network slice that is primarily served by the dynamic scheduled allocation.

In some embodiments, when dynamic scheduling indicates that SPS allocation should not be overridden, and/or multiple TBs may be transmitted per TTI for a given UE, multiple TBs may be formed. For example, the SPS associated DRBs based on the SPS allocation may form one or more TBs, and/or the DRBs associated to the dynamic scheduling allocation may form one or more TBs. These embodiments may also be applied for a single slice if multiple TBs may be formed when the UE attempts to connect to a network slice. For example, multiple TBs may be formed for coordinated multipoint (CoMP) or spatial diversity MIMO transmissions or guaranteed QoS for a particular service flow/DRB.

In some embodiments, if the dynamic scheduling allocation indicates that the MCS should override the MCS provided in the SPS allocation, the SPS allocation may use the MCS instructions in the dynamic scheduling in the following TTIs when the resource is allocated according to SPS allocation and/or in the current TTI if multiple transport blocks are formed based upon the SPS and dynamic allocation. If overriding is not indicated, the SPS may still use the MCS indicated in the SPS allocation unless only one transport block is formed.

In some embodiments, where and/or when a network slice-specific SPS allocation is provided, the UE that has been accessed and configured with a DRB for the given network slice may have SPS resources allocated for that DRB. For example, the SPS allocation for the given network slice may be either explicitly or implicitly indicated in the SPS allocation via a downlink scheduling control channel.

In some embodiments, the explicit indication may include a RAN-level identifier related to the given network slice and/or a network slice-specific SPS configuration ID if the RAN-level network slice identifier is included in SPS configuration information.

In some embodiments, an implicit indication may be used if a network slice-specific SPS configuration includes a range of PRBs. For example, the UE may derive the SPS allocation for the given network slice based on the PRBs allocated by the SPS allocation signaling, for example, a DCI in PDCCH in LTE or 5G, and the PRB range in the SPS configuration. In some embodiments, if the scheduled PRBs in SPS allocation are part of the PRBs in the slice-specific SPS configuration, the UE may derive that it is a SPS allocation for a given slice.

As the network slice-specific SPS configuration is provided to each UE accessing the network slice, a SPS interval in the SPS configuration may be short enough (frequent enough SPS resource allocation) to permit multiple UE to use the SPS configuration simultaneously. Individual UE may not need such frequent SPS resource allocation. In some embodiments, the SPS allocation via downlink scheduling control channel may indicate an integer number of multiplication of the SPS interval in the network slice-specific SPS configuration. For example, if a SPS interval in the SPS configuration is set to 10 ms, and the SPS allocation to a UE indicates a multiplication value of 10 for the SPS interval, the overridden SPS allocation interval will be set to 100 ms. It is noted that any multiplication value and/or SPS interval may be used.

Figure 3:
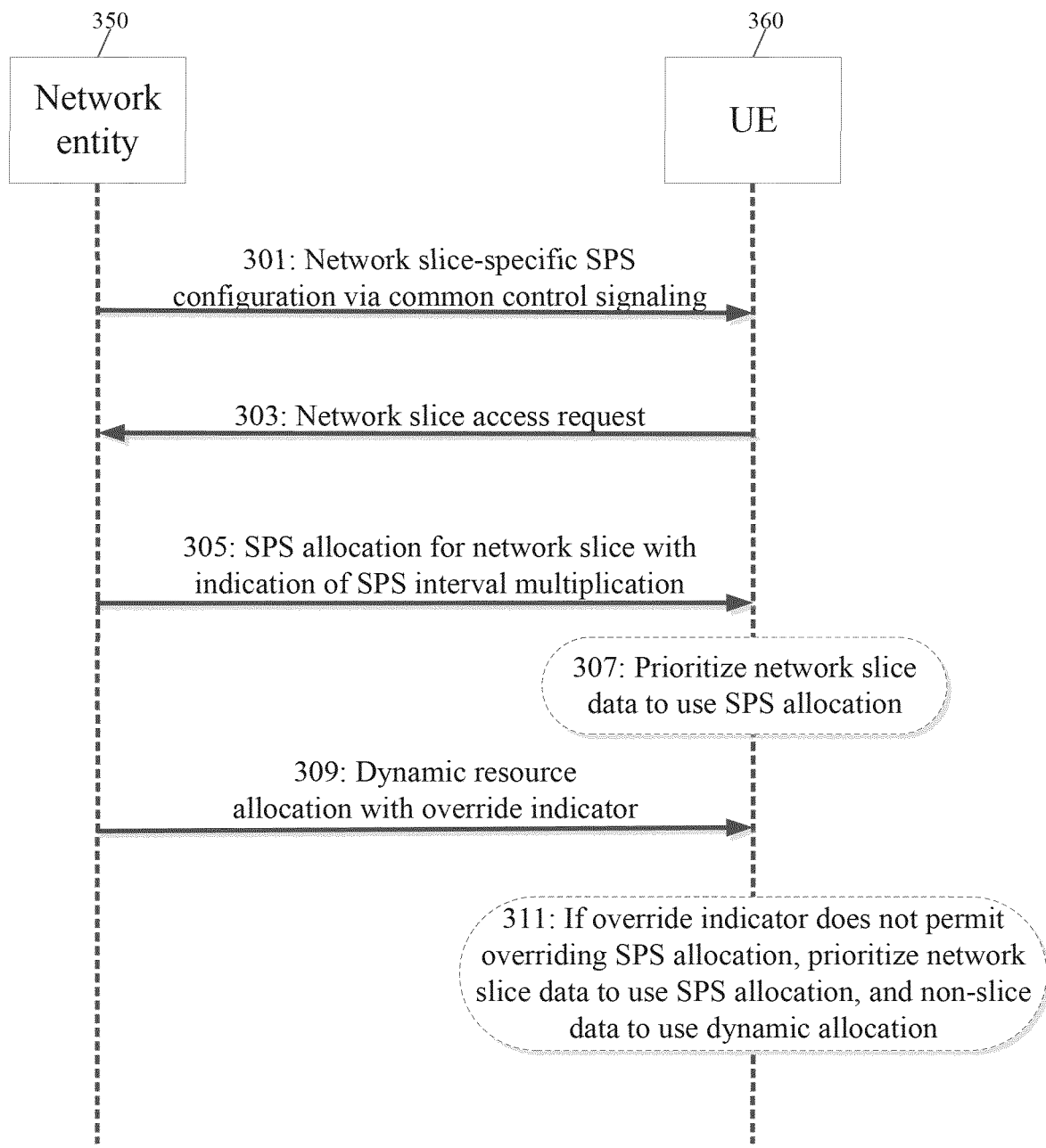
FIG. 3 illustrates an example of a signal flow diagram according to certain embodiments.

FIG. 3 illustrates an example of a signal flow diagram according to certain embodiments. For example, FIG. 3 illustrates a network entity interacting with user equipment to provide network slice-specific SPS configuration. In step 301, network entity 350 transmits network slice-specific SPS configuration via common control signaling to user equipment 360. In step 303, user equipment 360 transmits a network slice access request to network entity 350. In step 305, network entity 350 transmits a SPS allocation for a network slice with an indication of a SPS interval multiplication to user equipment 360. In step 307, user equipment 360 prioritizes network slice data to use the SPS allocation. In step 309, network entity 350 transmits a dynamic resource allocation with an override indicator to user equipment 360. In step 311, user equipment 360 prioritizes network slice data to use the SPS allocation, and non-slice data to use a dynamic allocation if the override indicator does not permit SPS allocation being overridden.

Figure 4:
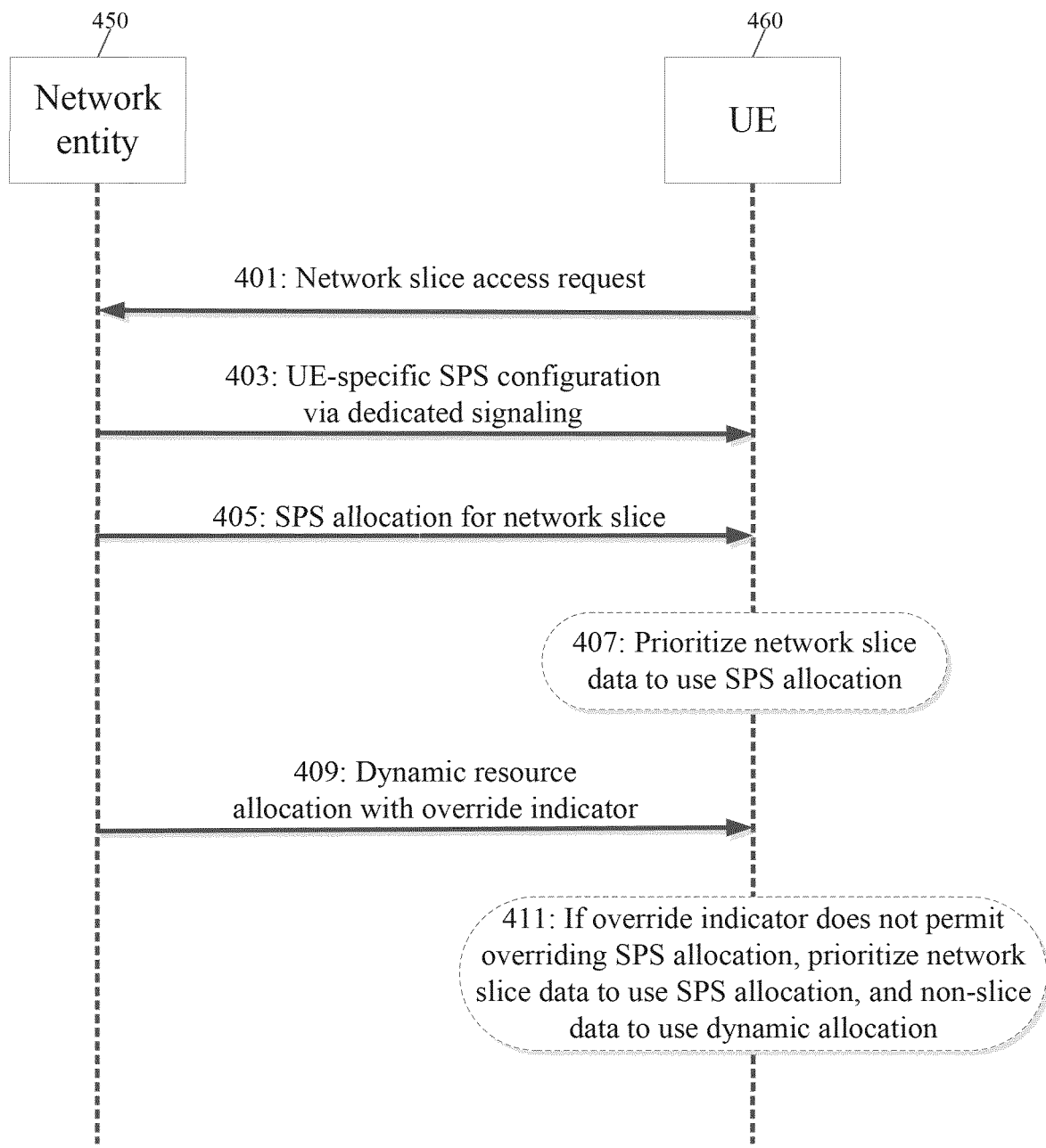
FIG. 4 illustrates an example of a signal flow diagram according to certain embodiments.

FIG. 4 illustrates an example of a signal flow diagram according to certain embodiments. For example, FIG. 4 illustrates a network entity interacting with user equipment to provide UE-specific SPS configuration. In step 401. In step 401, user equipment 460 transmits a network slice access request to network entity 450. In step 403, network entity 450 transmits a UE-specific SPS configuration to user equipment 460 via dedicated signaling. In step 405, network entity 450 transmits a SPS allocation for a network slice to user equipment 460. In step 407, user equipment 460 prioritizes network slice data to use the SPS allocation. In step 409, network entity 450 transmits a dynamic resource allocation with an override indicator to user equipment 460. In step 411, user equipment 460 prioritizes network slice data to use the SPS allocation, and non-slice data to use the dynamic allocation if the override indicator does not permit overriding SPS allocation.

Figure 5:
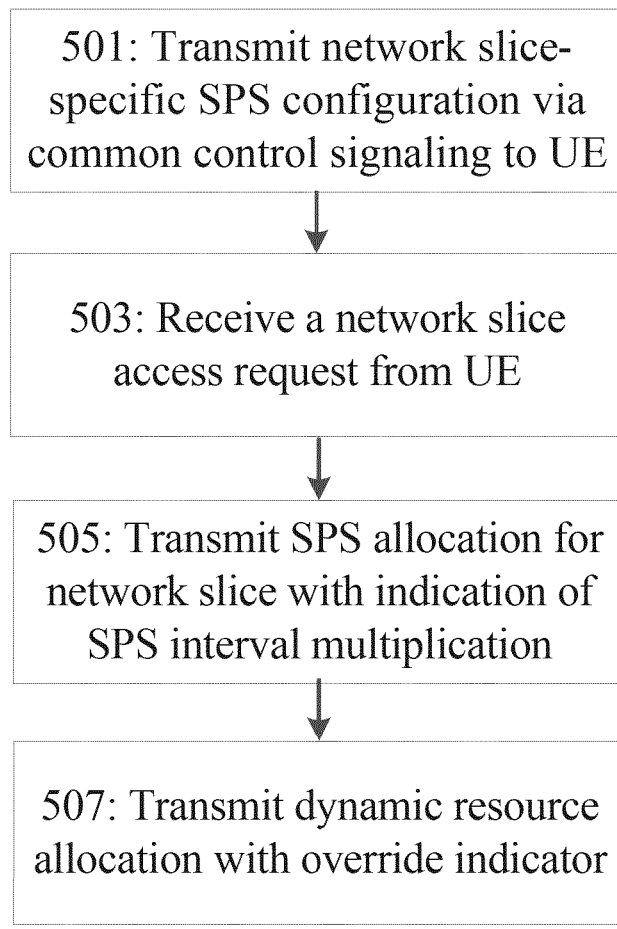
FIG. 5 illustrates an example of a method performed by a network entity according to certain embodiments.

FIG. 5 illustrates an example method of a network entity providing a SPS allocation to user equipment. In step 501, the network entity transmits network slice-specific SPS configuration data via common control signaling to a UE. In step 503, the network entity receives a network slice access request from a UE. In step 505, the network entity transmits a SPS allocation for the network slice with an indication of multiplication of a SPS interval. In step 507, the network entity transmits a dynamic resource allocation. In some embodiments, the dynamic resource allocation may contain an override indicator.

Figure 6:
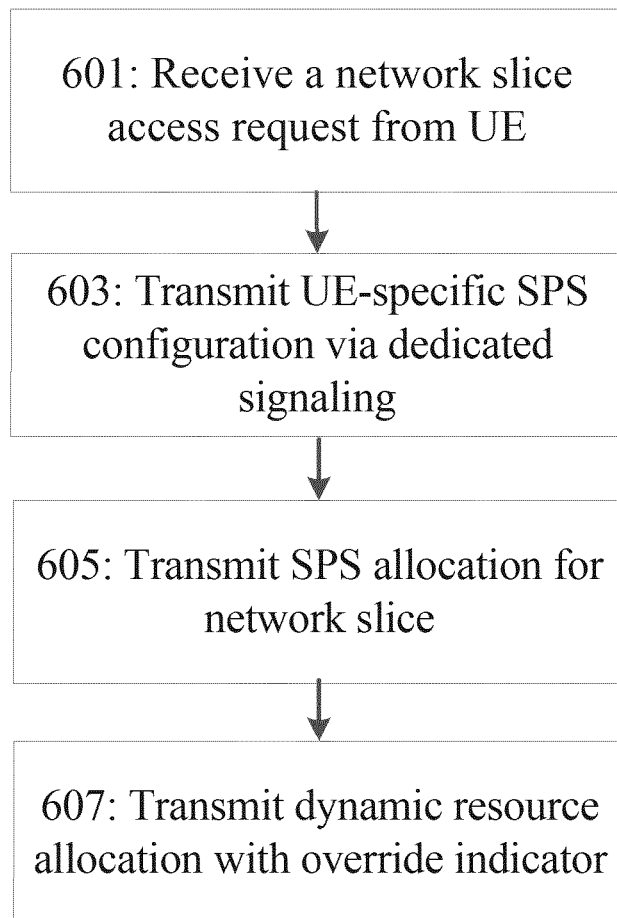
FIG. 6 illustrates an example of a method performed by a network entity according to certain embodiments.

FIG. 6 illustrates an example method of a network entity providing a SPS allocation to user equipment. In step 601, the network entity receives a network slice access request from a UE. In step 603, the network entity transmits UE-specific SPS configuration data via dedicated signaling. In step 605, the network entity transmits a SPS allocation for the network slice. In step 607, the network entity transmits a dynamic resource allocation with an override indicator.

Figure 7:
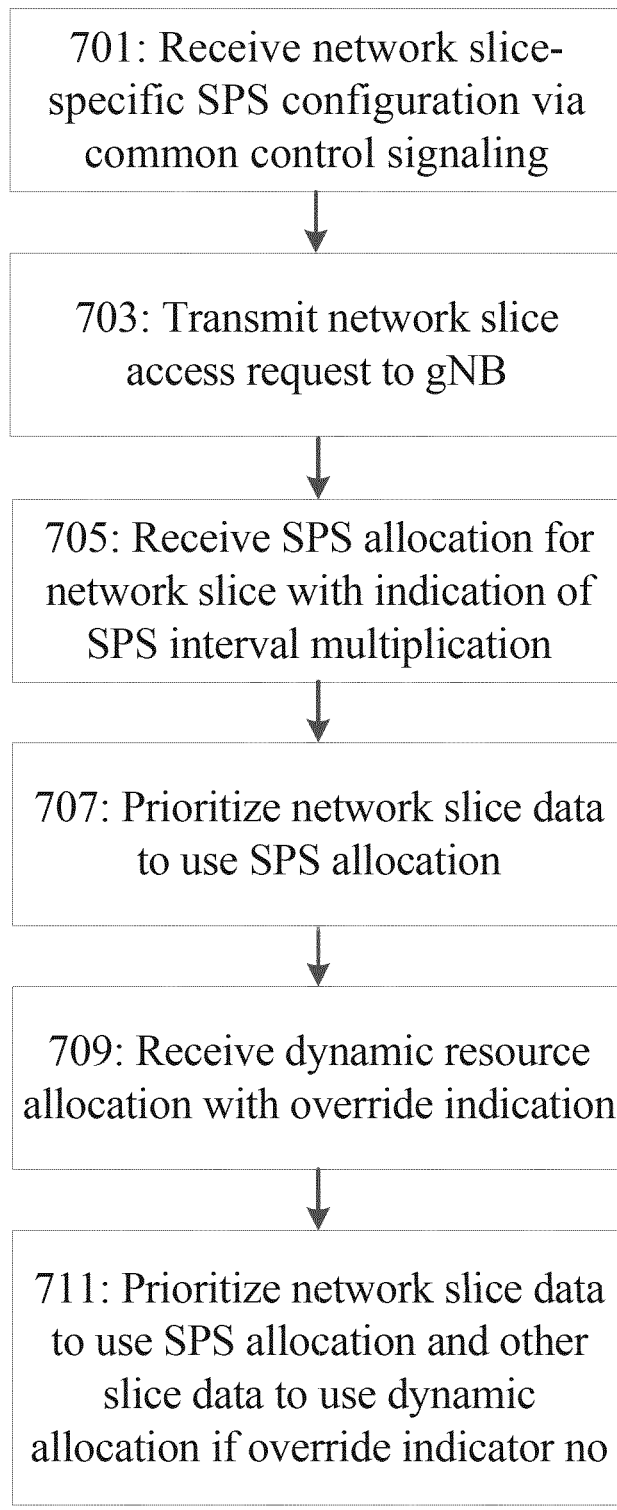
FIG. 7 illustrates an example of a method performed by a network entity according to certain embodiments.

FIG. 7 illustrates an example method of user equipment receiving a network slice-specific SPS allocation. In step 701, user equipment receives a network slice-specific SPS configuration via common control signaling. In step 703, user equipment transmits a network slice access request to a network entity. In step 705, user equipment receives a SPS allocation for a network slice with an indication of a SPS interval multiplication. In step 707, user equipment prioritizes network slice data to use SPS allocation. In step 709, user equipment receives dynamic resource allocation with an indication of whether to override the SPS configuration. In step 711, user equipment prioritizes network slice data to use the SPS allocation, and other slice data to use dynamic allocation if the override indicator indicates "no."

Figure 8:
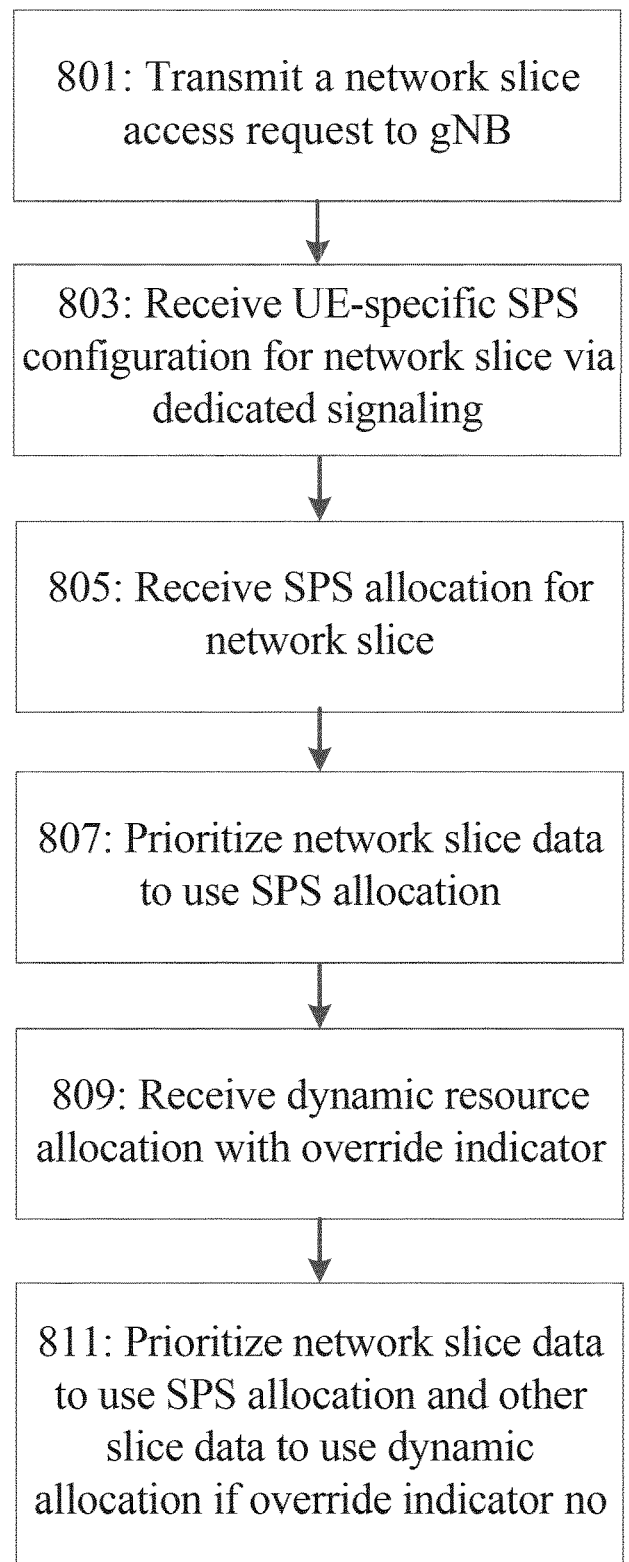
FIG. 8 illustrates an example of a method performed by a network entity according to certain embodiments.

FIG. 8 illustrates an example method of user equipment receiving a UE-specific SPS allocation. In step 801, user equipment transmits a network slice access request to a network entity. In step 803, user equipment receives UE-specific SPS configuration for the network slice via dedicated signaling. In step 805, user equipment receives SPS allocation for a network slice. In step 807, user equipment prioritizes network slice data to use the SPS allocation. In step 809, user equipment receives a dynamic resource allocation with an override indicator. In step 811, user equipment prioritizes network slice data to use SPS allocation and other slice data to use dynamic allocation if the override indicator is set to "no."

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

| | |
|---|---|
| 3GPP | 3rd Generation Partnership Project |
| AMF | Access and Mobility Management Function |
| AN | Access Network or Access Node |
| CCNF | Common Control Network Function |

-continued

Partial Glossary

| | |
|---|---|
| CCS | Common Control Signaling |
| CN | Core Network |
| CoMP | Coordinated Multipoint |
| CQI | Channel Quality Indication |
| C-RNTI | Cell Radio Network Temporary Identifier |
| DCI | Downlink Control Information |
| DRB | Data Radio Bearer |
| eNB | evolved Node B |
| E-UTRA | Evolved Universal Mobile Telecommunications System Terrestrial Radio Access |
| E-UTRAN | Evolved Universal Mobile Telecommunications System Terrestrial Radio Access Network |
| gNB | Next Generation Node B |
| HARQ | Hybrid Automatic Repeat Request |
| LTE | Long-Term Evolution |
| MAC | Medium Access Control |
| MCS | Modulation and Coding Scheme |
| NSI | Network Slice Instance |
| NSSAI | Network Slice Selection Assistance Information |
| PDCCH | Physical Downlink Control Channel |
| PRB | Physical Resource Block |
| QoS | Quality of Service |
| RAN | Radio Access Network |
| RRC | Radio Resource Control |
| SDN | Software-Defined Networking |
| SPS | SPS Semi-Persistent Scheduling |
| SR | Scheduling Request |
| SRAP | Sensor Reading and Actuator Pooling |
| SRB | Signaling Radio Bearer |
| TB | Transport Block |
| TBS | Transport Block Size |
| TTI | Transmission Time Interval |
| UE | User Equipment |

We claim:

1. A method, comprising:
    transmitting, by a network entity, a semi-persistent scheduling configuration to a user equipment;
    receiving, by the network entity, a resource allocation request from the user equipment;
    transmitting, by the network entity, a semi-persistent scheduling allocation to the user equipment; and
    transmitting, by the network entity, a dynamic resource allocation with an override indicator to the user equipment,
    wherein the override indicator comprises a field of at least one bit, wherein a first value of the field indicates that the user equipment is supposed to override the semi-persistent scheduling allocation with the dynamic resource allocation and a second value of the field, different from the first value of the field, indicates that the user equipment is not supposed to override the semi-persistent scheduling allocation with the dynamic resource allocation.

2. The method according to claim 1, wherein the semi-persistent scheduling configuration is user equipment-specific, and transmitted via dedicated signaling.

3. The method according to claim 1, wherein the semi-persistent scheduling configuration is network slice-specific, and transmitted via common control signaling.

4. The method according to claim 1, wherein the semi-persistent scheduling configuration is utilized for one or more first network slices, and dynamic scheduling is used for one or more second network slices.

5. The method according to claim 1, wherein the semi-persistent scheduling allocation includes a semi-persistent scheduling interval multiplication value.

6. The method according to claim 1, wherein the override indicator indicates that dynamic scheduling should override the semi-persistent scheduling allocation.

7. The method according to claim 1, wherein the override indicator indicates that dynamic scheduling should not override semi-persistent scheduling allocation and the modulation and coding scheme in dynamic scheduling should override the modulation and coding scheme used in specified semi-persistent scheduling allocated transmission time intervals.

8. The method according to claim 1, wherein the override indicator indicates that dynamic scheduling should be restricted from overriding the modulation and coding scheme and the allocated resources of semi-persistent scheduling allocation in specified semi-persistent scheduling allocated transmission time intervals.

9. The method according to claim 1, wherein the override indicator indicates that a modulation and coding scheme indicated in the semi-persistent scheduling allocation should be used for dynamic scheduling.

10. A computer program product embodied in a non-transitory computer-readable medium and encoding instructions that, when executed in hardware, control the hardware to perform the method according to claim 1.

11. A method, comprising:
receiving, by a user equipment, a semi-persistent scheduling configuration from a network entity;
transmitting, by the user equipment, a resource allocation request to the network entity;
receiving, by the user equipment, a semi-persistent scheduling allocation; and
receiving, by the user equipment, a dynamic resource allocation with an override indicator,
wherein the override indicator comprises a field of at least one bit, wherein a first value of the field indicates that the user equipment is supposed to override the semi-persistent scheduling allocation with the dynamic resource allocation and a second value of the field, different from the first value of the field, indicates that the user equipment is not supposed to override the semi-persistent scheduling allocation with the dynamic resource allocation.

12. The method according to claim 11, wherein the semi-persistent scheduling configuration is user equipment-specific, and transmitted via dedicated signaling.

13. The method according to claim 11, wherein the semi-persistent scheduling configuration is network slice-specific, and transmitted via common control signaling.

14. The method according to claim 11, wherein the semi-persistent scheduling configuration is utilized for one or more first network slices, and dynamic scheduling is used for one or more second network slices.

15. The method according to claim 11, wherein the semi-persistent scheduling allocation includes a semi-persistent scheduling interval multiplication value.

16. The method according to claim 11, further comprising:
in response to receiving the semi-persistent scheduling allocation, prioritizing, by the user equipment, data associated to the semi-persistent scheduling allocation to use the semi-persistent scheduling allocation.

17. The method according to claim 11, further comprising:
prioritizing, by the user equipment, data associated to the semi-persistent scheduling to use the semi-persistent scheduling allocation and prioritizing, by the user equipment, other data to use dynamic allocation in response to receiving an override indicator indicating that semi-persistent scheduling allocation should not be overridden.

18. The method according to claim 11, wherein the prioritizing further comprises:
determining one or more transport blocks and/or one or more portions of a transport block of corresponding radio bearer services or network slices according to the received SPS or dynamic resource allocations.

19. The method according to claim 11, further comprising:
overriding, by the user equipment, the semi-persistent scheduling allocation with dynamic scheduling in response to receiving an override indicator indicating that dynamic scheduling should override the semi-persistent scheduling allocation.

20. The method according to claim 11, further comprising:
using, by the user equipment, the modulation and coding scheme indicated in the dynamic scheduling in response to receiving an override indicator indicating that dynamic scheduling should not override semi-persistent scheduling allocation and the modulation and coding scheme in dynamic scheduling should override the modulation and coding scheme used in specified semi-persistent scheduling allocated transmission time intervals.

21. The method according to claim 11, further comprising:
restricting, by the user equipment, dynamic scheduling from overriding the modulation and coding scheme and allocated resources of semi-persistent scheduling allocation in specified semi-persistent scheduling allocated transmission time intervals in response to receiving an override indicator indicating that dynamic scheduling should be restricted from overriding the modulation and coding scheme and allocated resources of semi-persistent scheduling allocation in specified semi-persistent scheduling allocated transmission time intervals.

22. The method according to claim 11, further comprising:
applying, by the user equipment, a modulation and coding scheme indicated in the semi-persistent scheduling allocation for use in dynamic scheduling in response to receiving an override indicator indicating that a modulation and coding scheme indicated in the semi-persistent scheduling allocation should be used in dynamic scheduling.

23. A computer program product embodied in a non-transitory computer-readable medium and encoding instructions that, when executed in hardware, control the hardware to perform the method according to claim 10.

24. An apparatus, comprising:
at least one processor; and
at least one memory including computer program code,
wherein the at least one memory and the computer program code are configured to, with the at least one processor, cause the apparatus to at least:
transmit a semi-persistent scheduling configuration to a user equipment;
receive a resource allocation request from the user equipment;
transmit a semi-persistent scheduling allocation to the user equipment; and
transmit a dynamic resource allocation with an override indicator to the user equipment, wherein the override indicator comprises a field of at least one bit, wherein a first value of the field indicates that the user equipment is supposed to override the semi-persistent scheduling allocation with the dynamic resource allocation and a second value of the field, different from the first value of the field, indicates that the user equipment is not supposed to override the semi-persistent scheduling allocation with the dynamic resource allocation.

25. The apparatus according to claim 24, wherein the semi-persistent scheduling configuration is user equipment-specific, and transmitted via dedicated signaling.

26. The apparatus according to claim 24, wherein the semi-persistent scheduling configuration is network slice-specific, and transmitted via common control signaling.

27. The apparatus according to claim 24, wherein the semi-persistent scheduling configuration is utilized for one or more first network slices, and dynamic scheduling is used for one or more second network slices.

28. The apparatus according to claim 24, wherein the semi-persistent scheduling allocation includes a semi-persistent scheduling interval multiplication value.

29. The apparatus according to claim 24, wherein the override indicator indicates that dynamic scheduling should override the semi-persistent scheduling allocation.

30. The apparatus according to claim 24, wherein the override indicator indicates that dynamic scheduling should not override semi-persistent scheduling allocation and the modulation and coding scheme in dynamic scheduling should override the modulation and coding scheme used in specified semi-persistent scheduling allocated transmission time intervals.

31. The apparatus according to claim 24, wherein the override indicator indicates that dynamic scheduling should be restricted from overriding the modulation and coding scheme and the allocated resources of semi-persistent scheduling allocation in specified semi-persistent scheduling allocated transmission time intervals.

32. The apparatus according to claim 24, wherein the override indicator indicates that a modulation and coding scheme indicated in the semi-persistent scheduling allocation should be used for dynamic scheduling.

33. An apparatus, comprising:
at least one processor; and
at least one memory including computer program code,
wherein the at least one memory and the computer program code are configured to, with the at least one processor, cause the apparatus to at least:
receive a semi-persistent scheduling configuration from a network entity;
transmit a resource allocation request to the network entity;
receive a semi-persistent scheduling allocation; and
receive a dynamic resource allocation with an override indicator,
wherein the override indicator comprises a field of at least one bit, wherein a first value of the field indicates that the user equipment is supposed to override the semi-persistent scheduling allocation with the dynamic resource allocation and a second value of the field, different from the first value of the field, indicates that the user equipment is not supposed to override the semi-persistent scheduling allocation with the dynamic resource allocation.

34. The apparatus according to claim 33, wherein the semi-persistent scheduling configuration is user equipment-specific, and transmitted via dedicated signaling.

35. The apparatus according to claim 33, wherein the semi-persistent scheduling configuration is network slice-specific, and transmitted via common control signaling.

36. The apparatus according to claim 33, wherein the semi-persistent scheduling allocation includes a semi-persistent scheduling interval multiplication value.

37. The apparatus according to claim 33, further comprising:
in response to receiving the semi-persistent scheduling allocation, prioritizing, by the user equipment, data associated with the semi-persistent scheduling allocation to use the semi-persistent scheduling allocation.

38. The apparatus according to claim 33, further comprising:
prioritizing, by the user equipment, data associated with the semi-persistent scheduling to use the semi-persistent scheduling allocation and prioritizing, by the user equipment, other data to use dynamic allocation in response to receiving an override indicator indicating that semi-persistent scheduling allocation should not be overridden.

39. The apparatus according to claim 33, wherein the prioritizing further comprises:
determining one or more transport blocks or one or more portions of a transport block of corresponding radio bearer services or network slices according to the received SPS or dynamic resource allocations.

40. The apparatus according to claim 33, further comprising:
overriding, by the user equipment, the semi-persistent scheduling allocation with dynamic scheduling in response to receiving an override indicator indicating that dynamic scheduling should override the semi-persistent scheduling allocation.

41. The apparatus according to claim 33, further comprising:
using, by the user equipment, the modulation and coding scheme indicated in the dynamic scheduling in response to receiving an override indicator indicating that dynamic scheduling should not override semi-persistent scheduling allocation and the modulation and coding scheme in dynamic scheduling should override the modulation and coding scheme used in specified semi-persistent scheduling allocated transmission time intervals.

42. The apparatus according to claim 33, further comprising:
restricting, by the user equipment, dynamic scheduling from overriding the modulation and coding scheme and allocated resources of semi-persistent scheduling allocation in specified semi-persistent scheduling allocated transmission time intervals in response to receiving an override indicator indicating that dynamic scheduling should be restricted from overriding the modulation and coding scheme and allocated resources of semi-persistent scheduling allocation in specified semi-persistent scheduling allocated transmission time intervals.

43. The apparatus according to claim 33, further comprising:
applying, by the user equipment, a modulation and coding scheme indicated in the semi-persistent scheduling allocation for use in dynamic scheduling in response to receiving an override indicator indicating that a modulation and coding scheme indicated in the semi-persistent scheduling allocation should be used in dynamic scheduling.

\* \* \* \* \*